United States Patent
Seo (10) Patent No.: US 9,621,467 B1
(45) Date of Patent: Apr. 11, 2017

(54) ITERATIVE FRAME SYNCHRONIZATION FOR MULTIPLE-LANE TRANSMISSION

(71) Applicant: ALTERA CORPORATION, San Jose, CA (US)

(72) Inventor: Jaewon Seo, San Jose, CA (US)

(73) Assignee: Altera Corporation, San Jose, CA (US)

(*) Notice: Subject to any disclaimer, the term of this patent is extended or adjusted under 35 U.S.C. 154(b) by 100 days.

(21) Appl. No.: 14/470,729

(22) Filed: Aug. 27, 2014

(51) Int. Cl.
*H04L 12/803* (2013.01)
*H04L 12/801* (2013.01)

(52) U.S. Cl.
CPC ............ *H04L 47/125* (2013.01); *H04L 47/39* (2013.01)

(58) Field of Classification Search
None
See application file for complete search history.

(56) References Cited

U.S. PATENT DOCUMENTS

| | | | | |
|---|---|---|---|---|
| 6,690,757 | B1 * | 2/2004 | Bunton | H04L 25/14 370/427 |
| 6,757,348 | B1 * | 6/2004 | Vila | G06F 5/065 370/356 |
| 7,398,334 | B1 * | 7/2008 | Thorpe | G06F 13/4018 710/29 |
| 8,793,445 | B1 | 7/2014 | Yan | |
| 2002/0112099 | A1 * | 8/2002 | Collier | H04L 5/1469 710/1 |
| 2002/0150049 | A1 * | 10/2002 | Collier | H04L 47/10 370/236 |
| 2003/0112827 | A1 * | 6/2003 | Cox | H04J 3/0605 370/509 |
| 2008/0147916 | A1 * | 6/2008 | Mao | G06F 5/06 710/52 |
| 2008/0204285 | A1 * | 8/2008 | Carter | H04L 5/0092 341/67 |
| 2011/0123196 | A1 | 5/2011 | Ye et al. | |
| 2013/0262941 | A1 * | 10/2013 | Wang | H04L 25/14 714/712 |

OTHER PUBLICATIONS

InfiniBand Trade Association, "InfiniBand Architecture Specification", vol. 1, Release 1.2.1. pp. 1-431.*

* cited by examiner

*Primary Examiner* — Ayaz Sheikh
*Assistant Examiner* — Tarell Hampton
(74) *Attorney, Agent, or Firm* — Okamoto & Benedicto LLP (57) ABSTRACT

One embodiment relates to a data transmission circuit with deterministic flow control that includes a plurality of FIFO buffers, a plurality of transmitter lanes, a transmitter MAC circuit, and a transmitter aligner circuit. The transmitter aligner circuit includes control circuitry that performs one or more iterations of a procedure to optimize a starting offset, where the starting offset provides an initial delay between the writing of the data bits to the plurality of FIFO buffers and the reading of the data bits from the plurality of FIFO buffers. Another embodiment relates to a method of reducing data path latency in a data transmission circuit with deterministic flow control. Other embodiments, aspects, and features of the invention are also disclosed.

20 Claims, 6 Drawing Sheets

ITERATIVE FRAME SYNCHRONIZATION FOR MULTIPLE-LANE TRANSMISSION

TECHNICAL FIELD

The present invention relates generally to the transfer of data in data processing systems.

DESCRIPTION OF THE BACKGROUND ART

Electronic components within a system may use serializer/de-serializer circuitry to transmit data by way of high-speed serial links. Such high-speed serial links allow for point-to-point data transfers to be made without the need to obtain access to a shared parallel bus. In order to increase the available bandwidth of a point-to-point link, multiple serial lanes may be included in the link.

A high-speed interface with multiple serial lanes needs transmitter lane alignment to allow the receiver partner to restore striped data from the multiple lanes. Sufficient buffer margins for the lanes are needed to avoid underflow and overflow of the transmitter lane buffers. However, large buffer margins results in long latencies.

SUMMARY

One embodiment relates to a data transmission circuit with deterministic flow control that includes a plurality of FIFO buffers, a plurality of transmitter lanes, a transmitter MAC circuit, and a transmitter aligner circuit. The transmitter aligner circuit includes control circuitry that performs one or more iterations of a procedure to optimize a starting offset, where the starting offset provides an initial delay between the writing of the data bits to the plurality of FIFO buffers and the reading of the data bits from the plurality of FIFO buffers.

Another embodiment relates to a method of reducing data path latency in a data transmission circuit with deterministic flow control. A starting offset is set to an initial value, where the starting offset provides an initial delay between writing data bits to a plurality of FIFO buffers and reading the data bits from the plurality of FIFO buffers. The method waits until all of the plurality of FIFO buffers have asserted a low-fullness level signal. Thereafter, one or more iterations of a procedure is performed to determine the starting offset.

Other embodiments, aspects, and features of the invention are also disclosed. Other embodiments, aspects, and features are also disclosed.

DETAILED DESCRIPTION

Recent serial protocol communication circuits typically require low latency and small area of implementation on a microchip. Serial protocol communication circuits typically include a per lane physical coding sublayer (PCS) block with a FIFO interface and a media access control (MAC) block.

The present disclosure provides circuits and methods to reduce latency in the PCS FIFO. The circuits and methods disclosed herein utilize iterative frame synchronization in combination with deterministic flow control. The deterministic flow control generates credit based on an actual (expected) data usage of a serial protocol in a deterministic manner. In other words, the deterministic flow control provides a quantified amount of data which the PCS needs.

The circuits and methods disclosed herein employ the iterative frame synchronization to discover an optimal starting offset in the timing of the deterministic flow control. With this approach, the FIFO level (i.e. the fullness of the FIFO) is kept low, which can decrease the data path latency.

In one embodiment, the circuitry and methods disclosed herein may be implemented with hard-wired circuitry on an integrated circuit chip, such as, for example, a field programmable gate array (FPGA). Implementation with hard-wired circuitry advantageously saves area and logic resources in an FPGA with limited resources.

Figure 1:
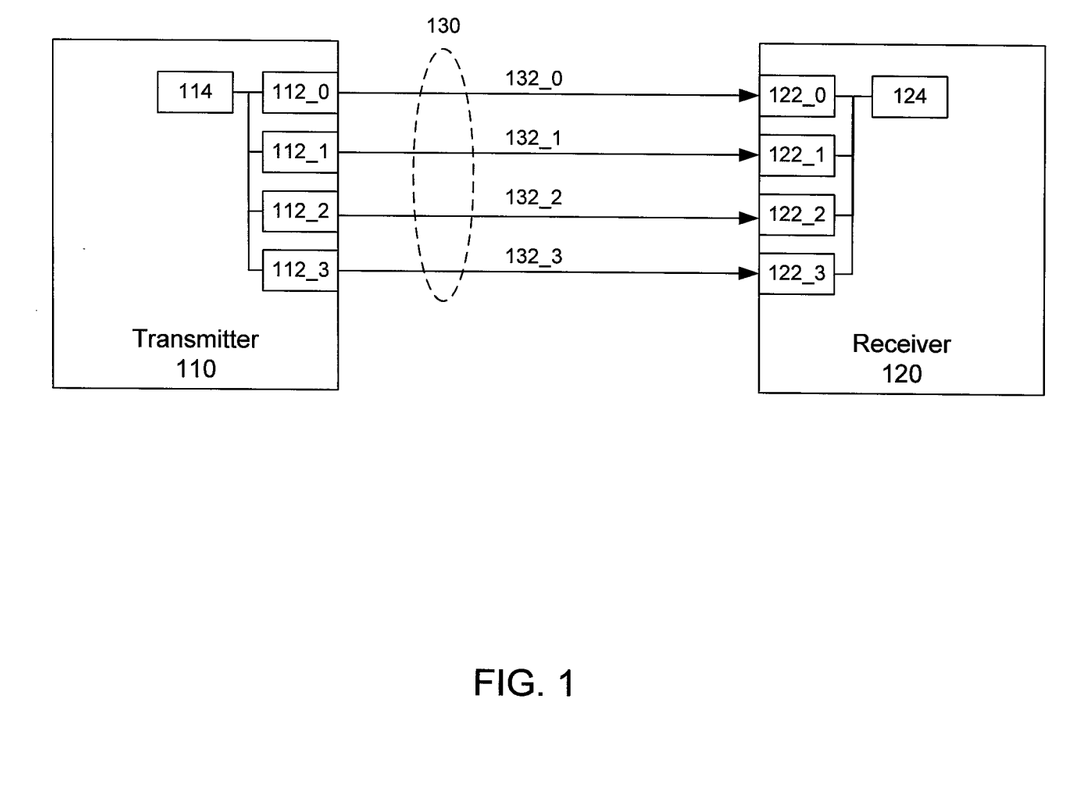
FIG. 1 depicts an exemplary unidirectional multi-lane point-to-point link in accordance with an embodiment of the present invention.

FIG. 1 depicts an exemplary multi-lane point-to-point link 130 in accordance with an embodiment of the invention. As shown, the link 130 goes from a transmitter 110 to a receiver 120.

As further shown, the link 130 may comprise multiple lanes, in this example, four lanes (132_0, 132_1, 132_2, and 132_3). Of course, other numbers of lanes may be implemented and showing a four lane structure is merely exemplary and not intended to limit the scope of the present invention. Operations at the transmitter 110 may be controlled by transmitter control circuitry 114, and operations at the receiver 120 may be controlled by receiver control circuitry 124.

Serial data may be multiplexed at the transmitter 110 to create multiple serial data streams, one for each lane 132. There may be a first transmission (TX) queue 112_0 for the serial data to be transmitted on the first lane 132_0, a second TX queue 112_1 for the serial data to be transmitted on the second lane 132_1, a third TX queue 112_2 for the serial data to be transmitted on the third lane 132_2, and a fourth TX queue 112_3 for the serial data to be transmitted on the fourth lane 132_3. Each TX queue 112 may be implemented as a first-in-first-out (FIFO) queue, for example.

At the receiver 120, there may be a first FIFO receive (RX) buffer 122_0 for the serial data that is received on the first lane 132_0, a second FIFO RX buffer 122_1 for the serial data that is received on the second lane 132_1, a third FIFO RX buffer 122_2 for the serial data that is received on the third lane 132_2, and a fourth FIFO RX buffer 122_3 for the serial data that is received on the fourth lane 132_3. Each FIFO RX buffer 122 may be implemented as a FIFO RX buffer with an individually controllable delay. The receiver 120 may be configured to control the delay for each of the FIFO RX buffers 122 so as to deskew the serial data streams received on the multiple lanes such that the received data is aligned across the lanes. The receiver 120 may also be configured to de-multiplex the aligned data from the multiple lanes to recreate the original serial data.

While FIG. 1 shows a one-way link between a transmitter and a receiver, a multi-lane point-to-point link may also be bi-directional between two transceivers. Such a bi-directional link would include a second transmitter on the same integrated circuit as the receiver 120 that communicates via a second one-way multi-lane point-to-point link to a second receiver on the same integrated circuit as the transmitter 110.

Figure 2:
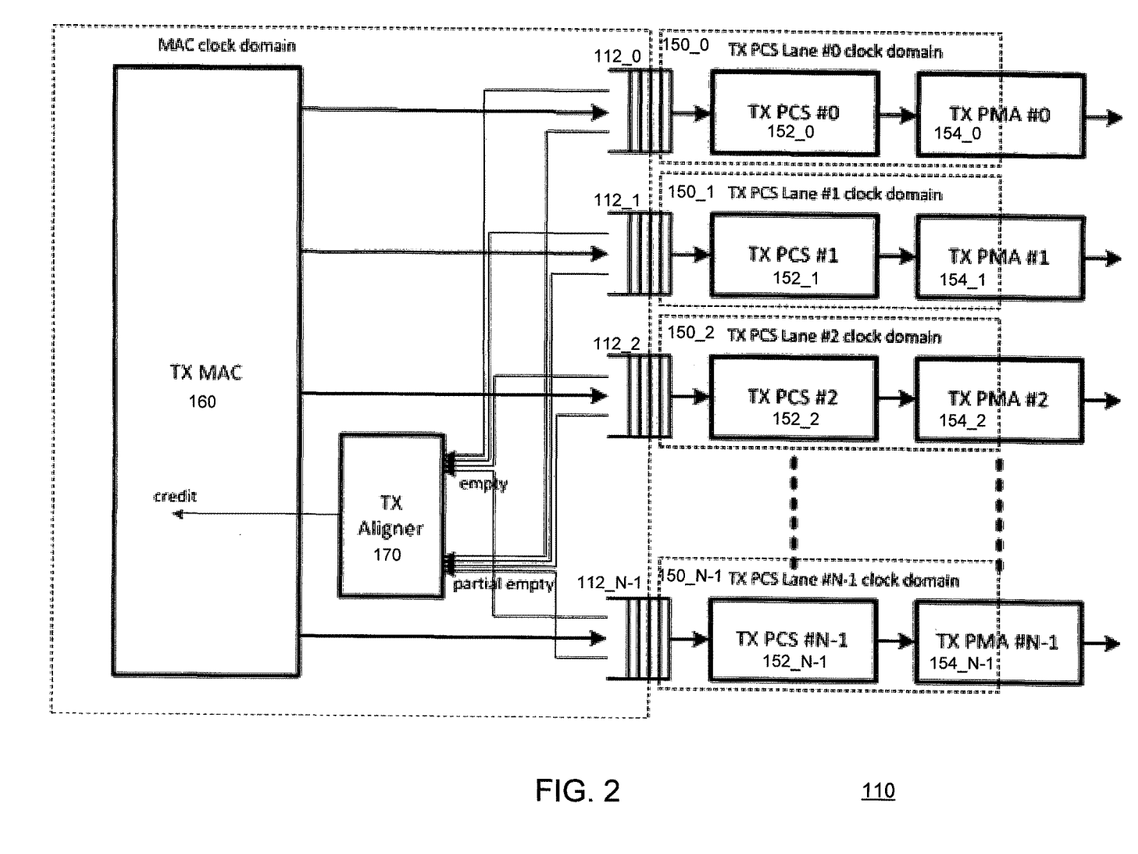
FIG. 2 depicts exemplary circuit blocks of a transmitter in accordance with an embodiment of the invention.

FIG. 2 depicts exemplary circuit blocks of a transmitter 110 in accordance with an embodiment of the invention. The circuit blocks shown include: a transmitter media access control (TX MAC) circuit 160; a transmitter aligner (TX Aligner) circuit 170; multiple TX FIFO queues, one per lane for N lanes (112_0, 112_1, 112_2, . . . , 112_N–1); and multiple transmitter lane circuits (150_0, 150_1, 150_2, . . . , 150_N–1).

The N transmitter lane circuits (150_0, 150_1, 150_2, . . . , 150_N–1) may be formed from N transmitter physical coding sublayer circuits (TX PCS #0 152_0, TX PCS #1 152_1, TX PCS #2 152_2, . . . , TX PCS #N–1 152_N–1) and N transmitter physical medium attachment circuits (TX PMA #0 154_0, TX PMA #1 154_1, TX PMA #2 154_2, . . . , TX PMA #N–1 154_N–1). In other words, each transmitter lane circuit 150_n may include a transmitter physical coding sublayer (TX PCS) circuit 152_n and a corresponding transmitter physical medium attachment (TX PMA) circuit 154_n.

As shown, the transmitter 110 may have multiple clock domains. The clock domains may include: a media access control (MAC) clock domain; and multiple TX PCS clock domains, one per lane for N lanes (TX PCS Lane #0 clock domain; TX PCS Lane #0 clock domain; TX PCS Lane #1 clock domain; . . . TX PCS Lane #N–1 clock domain).

The TX MAC may stripe data bytes to each of the N TX FIFO queues (112_0, 112_1, 112_2, . . . , 112_N–1). Each of the N TX FIFO queues (112_0, 112_1, 112_2, . . . , 112_N–1) provides bytes to its corresponding TX PCS and TX PMA circuits.

The TX PCS circuit provides digital logic functions that implement data communication protocols, including generation of a frame header to indicate the frame boundary. The frame header enables the receiver (the receiving partner circuit) to properly align the striped data received from the multiple lanes. The TX PMA circuit provides mixed (analog/digital) signal functionality for the data communications, including serializing the data for transmission as serial data on the associated lane.

As depicted, empty and partial empty signals (empty and partial empty flags) may be provided by each TX FIFO queue 112 to a transmitter aligner control circuit (TX Aligner). The assertion of the empty signal indicates that the associated FIFO queue is empty. The assertion of the partial empty signal indicates that the associated FIFO queue is at or below a "partial empty" (or "low water") threshold.

As further depicted, a credit signal may be asserted by the TX Aligner to the TX MAC. In one implementation, the credit signal may be a single-bit signal. The TX MAC may respond to the assertion of the credit signal by putting data words to the lanes so that the TX FIFO queues 112_0 to 112_N–1 are non-empty.

Figure 3:
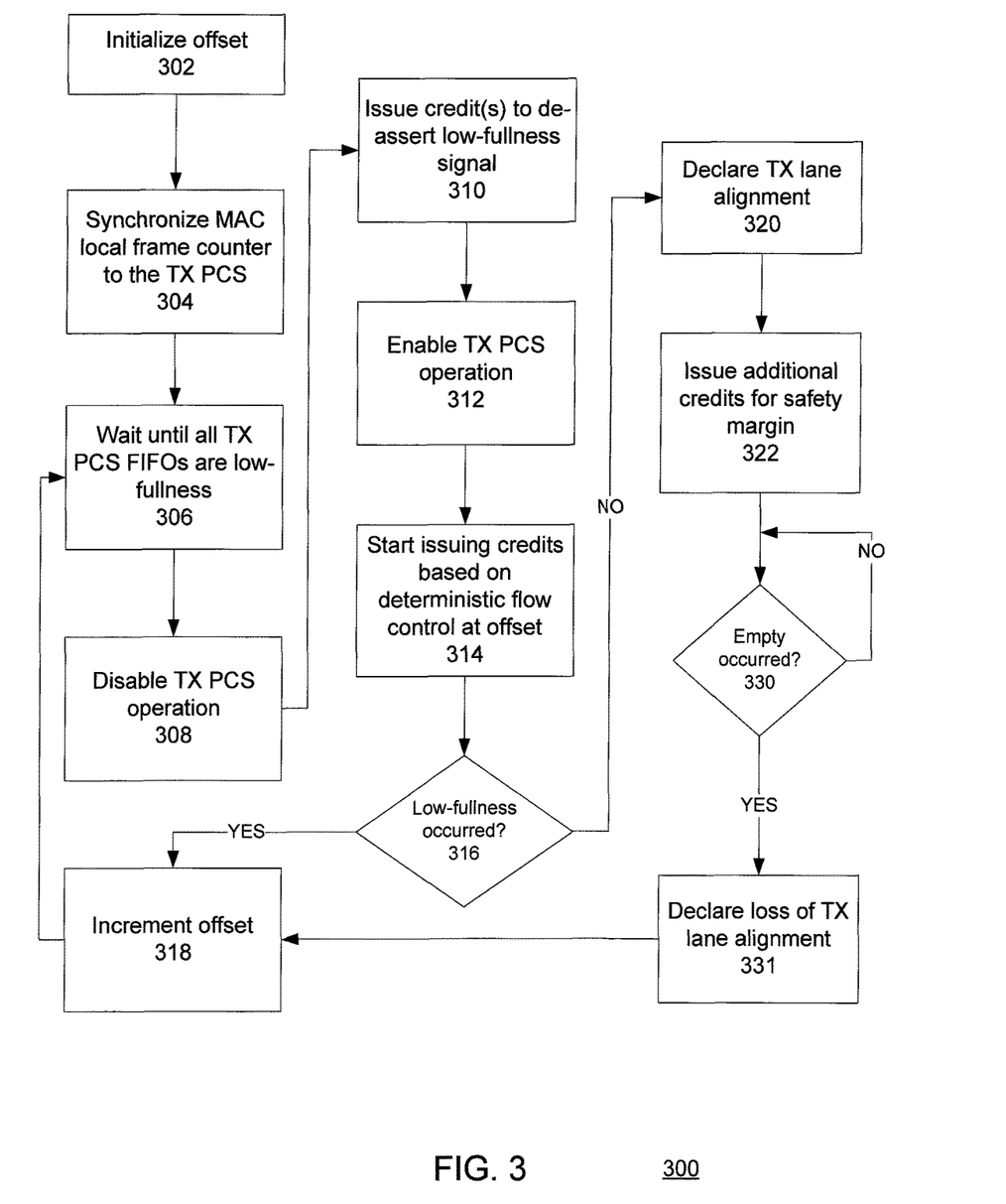
FIG. 3 is a flow chart of a technological process of iterative frame synchronization for transmitter lane alignment in accordance with an embodiment of the present invention.

FIG. 3 is a flow chart of a technological process 300 of iterative frame synchronization for transmitter lane alignment in accordance with an embodiment of the present invention. The technological process 300 in FIG. 3A may be implemented using the transmitter circuit blocks described above in relation to FIG. 2. An example timing diagram for the technological process 300 is shown in FIG. 4.

Figure 4:
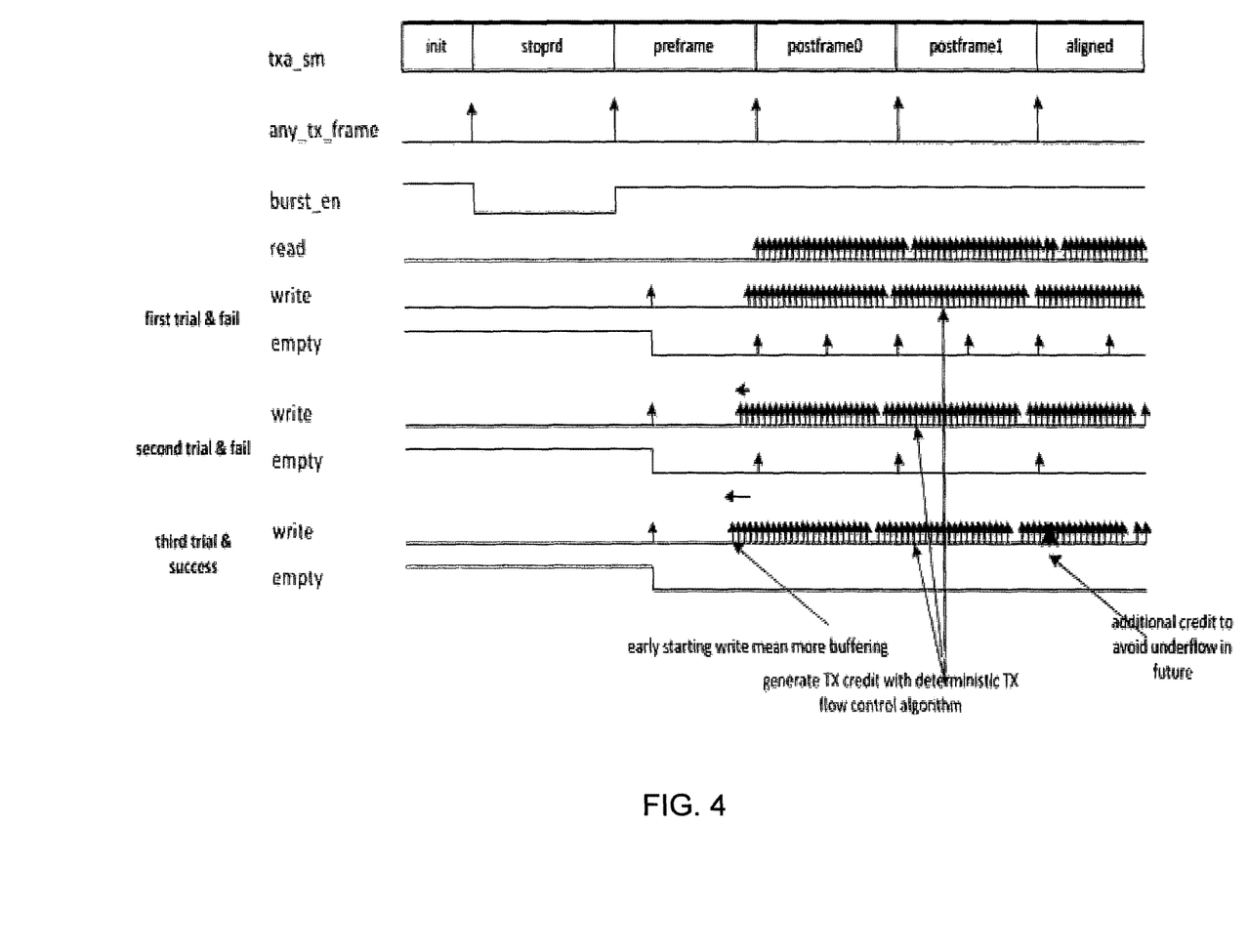
FIG. 4 is a timing diagram for a technological process of iterative frame synchronization in accordance with an embodiment of the present invention.

Per block 302, the starting offset for the deterministic flow control (DFC) is initialized during an initialization stage (txa_sm=init in FIG. 4). The starting offset may correspond to the offset in clock cycles between the start of writing (putting) data to a TX FIFO queue and the start of reading (getting) data from the TX FIFO queue.

In one embodiment, the starting offset may be set to an initial value that is sufficiently small so that a FIFO empty or underflow condition is experienced (so that an empty or underflow signal is found per block 316) in an initial iteration of the deterministic flow control procedure described below. In one particular implementation, the minimum offset that may be a zero offset.

Per block 304, the MAC local frame counter may be synchronized to the frame counter for the TX PCS. This counter synchronization may also be performed during the initialization stage in FIG. 4. The phase of the MAC local frame counter may be different from the TX PCS internal frame counter. The MAC local frame counter advances whenever the gearbox takes a single PCS word. The MAC local frame counter rolls back to zero when it reaches a frame length minus one.

Per block 306, the technological process 300 may wait until the TX FIFOs for all the PCS lanes have reached a low-fullness level. In one embodiment, the low-fullness level may be an empty level that indicates that the corresponding TX FIFO is empty. In an alternate embodiment, the low-fullness level may be a partial empty level that indicates that the corresponding TX FIFO is at or below a predetermined partial empty threshold level. This waiting may also be performed during the initialization stage in FIG. 4.

In the circuit embodiment depicted in FIG. 2, the process 300 may wait until empty (or, alternatively, partial empty) signals are received by the TX Aligner from all the PCS lanes. After asserted empty (or, alternatively, partial empty) signals are received for all the PCS lanes, the waiting is done such that the initialization stage may end.

Subsequently, per block 308, the TX PCS operation may be disabled. Per the timing diagram of FIG. 4, the TX PCS operation may be disabled by de-asserting the burst enable (burst en) signal as depicted during the "stop read" (txa_sm="stoprd") frame.

Subsequently, a single credit may be issued to the TX MAC per block 310 when empty flag is used for low fullness signal. In an alternate embodiment, multiple credit may be issued to de-assert partial empty signal per block 310. In the timing diagram of FIG. 4, this credit issuance is depicted as an assertion (up arrow) of a write signal during a "preframe" frame (txa_sm="preframe") (for each of multiple trials). In one embodiment, the credit issuance is performed by the TX Aligner asserting a credit signal to the TX MAC. In FIG. 4, example first, second and third trials are shown. There may be more or less trials needed until success is achieved.

As a result of the credit issuance, the TX MAC writes data to the TX FIFO queue for each PCS lane. This causes the empty or partial empty signals for all the PCS lanes to be de-asserted during the preframe (for each of the multiple trials).

Per block 312, the TX PCS operation is then enabled at the beginning of the next frame (txa_sm="postframe0"). Per block 314, while TX PCS operation is enabled, TX credits may be generated and issued using a deterministic TX flow control algorithm.

As illustrated in FIG. 4, the issuance of the credits per block 314 to start the writing of data to the TX FIFO queues may start earlier than the reading of data from the TX FIFO queues. In the example timing diagram depicted in FIG. 4, the reading of data from the TX FIFOs may begin at the end of the preframe, while the issuance of credits that start the writing to the TX FIFOs may begin earlier during the preframe. The number of cycles that the start of writing precedes the start of reading depends on the starting offset.

Per block 316, monitoring may be performed for a predetermined monitoring period (i.e. during a predetermined number of frame periods) during the TX PCS operation to determine whether a low-fullness condition occurs in relation to the TX FIFO queues for the TX PCS lanes. The low-fullness condition occurs when one or more of the low-fullness signals are asserted, regardless of the state of the read enable signal of the TX PCS. In an alternate embodiment, a determination may be made (at block 316) as to whether an underflow (instead of a low-fullness) condition occurs. Such an underflow condition occurs when one or more of the empty signals are asserted while the read enable signal of the TX PCS is asserted.

Per block 316, the technological process 300 has a branch point depending whether or not an underflow (or low-fullness) condition occurred during the monitoring period.

In a low-fullness (or underflow) condition occurred during the monitoring period, then the starting offset may be incremented per block 318. In an exemplary implementation, the starting offset may be incremented by one clock cycle. Thereafter, the technological process 300 may loop back to block 306 and perform a next iteration with the new starting offset.

In the example timing diagram of FIG. 4, an empty signal is asserted (indicating occurrence of an empty condition) two times during each of postframe0 and postframe1 in the first trial (first iteration). Hence, the first trial is a fail, so that the starting offset is incremented, and a second trial (second iteration) is performed. In the second trial, an empty signal is asserted one time during each of postframe0 and postframe1 Hence, the second trial is a fail, so that the starting offset is again incremented, and a third trial (third iteration) is performed.

If no low-fullness (or underflow) condition occurs during the monitoring period, then the TX lane alignment may be declared per block 320. In one implementation, the declaration of TX lane alignment may be performed by setting a TX lane alignment flag. The setting of the TX lane alignment flag indicates that a satisfactory starting offset has been determined such that no more trials (iterations) need be performed. However, while the starting offset appears to be satisfactory since no low-fullness (or underflow) condition occurred, a safety margin against future empties (or underflows) may be desirable.

In the example timing diagram of FIG. 4, no empty signal is asserted during postframe0 and postframe1 in the third trial (third iteration). Hence, the third trial is a success in that the starting offset was sufficiently long (i.e. the buffering between writes and reads was sufficient) to prevent an empty condition from occurring. Hence, after the third trial, the TX lane alignment may be declared after postframe1.

After a successful iteration is performed, in order to provide a safety margin, a predetermined number of additional credits may be provided to the TX MAC, per block 322, so that a predetermined number of additional data bits may be put to the TX FIFO queues. These additional credits are shown by the larger-sized arrow in the aligned (txa_sm="aligned") frame after the successful third trial in FIG. 4. These additional data bits provide a safety margin against the occurrence of an underflow (or low-fullness) condition in the future.

Note that the issuance of additional credits per block 322 is particularly useful if empty signals (instead of partial empty) signals are utilized in block 306. If partial empty signals are utilized in block 306, then no issuance of additional credits per block 322 may be necessary.

Finally, even after TX lane alignment is declared and additional credits issued for the safety margin, monitoring continues to check whether an empty condition occurs per block 330. If an empty condition does occur (due to an empty signal being asserted), then loss of lane alignment may be declared per block 332. In one implementation, the declaration of the loss of TX lane alignment may be performed by resetting a TX lane alignment flag.

After a loss of the TX lane alignment, the technological process 300 may return to block 318 so as to increment the starting offset. Thereafter, the technological process 300 may loop back to block 306 and perform a next iteration with the new starting offset.

Figure 5:
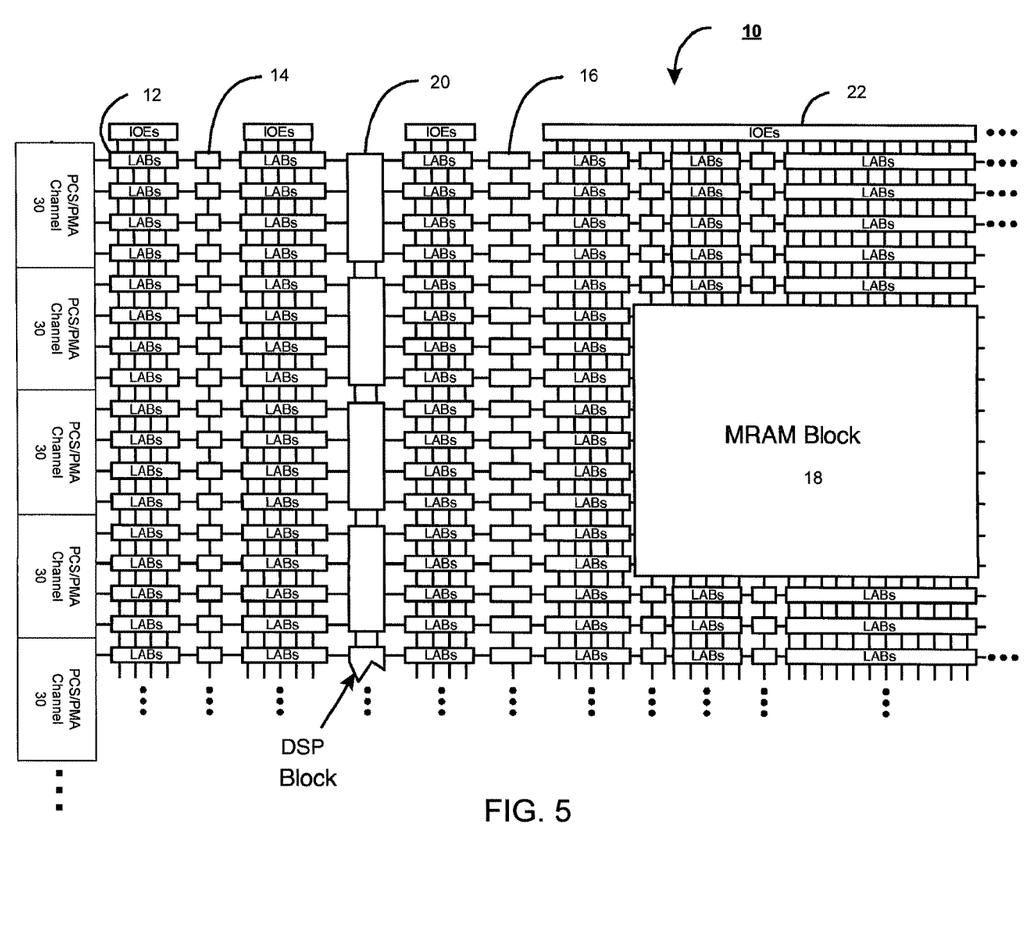
FIG. 5 is a simplified partial block diagram of a field programmable gate array (FPGA) that may be configured to implement an embodiment of the present invention.

FIG. 5 is a simplified partial block diagram of a field programmable gate array (FPGA) 10 that may be configured with circuitry to implement an embodiment of the present invention. It should be understood that embodiments of the present invention can be used in numerous types of integrated circuits such as field programmable gate arrays (FPGAs), programmable logic devices (PLDs), complex programmable logic devices (CPLDs), programmable logic arrays (PLAs), digital signal processors (DSPs) and application specific integrated circuits (ASICs).

FPGA 10 includes within its "core" a two-dimensional array of programmable logic array blocks (or LABs) 12 that are interconnected by a network of column and row interconnect conductors of varying length and speed. LABs 12 include multiple (e.g., ten) logic elements (or LEs).

An LE is a programmable logic block that provides for efficient implementation of user defined logic functions. An FPGA has numerous logic elements that can be configured to implement various combinatorial and sequential functions. The logic elements have access to a programmable interconnect structure. The programmable interconnect structure can be programmed to interconnect the logic elements in almost any desired configuration.

FPGA 10 may also include a distributed memory structure including random access memory (RAM) blocks of varying sizes provided throughout the array. The RAM blocks include, for example, blocks 14, blocks 16, and block 18. These memory blocks can also include shift registers and FIFO buffers.

FPGA 10 may further include digital signal processing (DSP) blocks 20 that can implement, for example, multipliers with add or subtract features. Input/output elements (IOEs) 22 located, in this example, around the periphery of the chip support numerous single-ended and differential input/output standards. Each IOE 22 is coupled to an external terminal (i.e., a pin) of FPGA 10.

An array of physical coding sublayer (PCS) and physical medium attachment (PMA) circuitry 30 may be included as shown, for example. The PCS circuitry generally provides digital logic functions which implement data communication protocols, while the PMA circuitry generally provides mixed (analog/digital) signal functionality for the data communications. For example, for certain protocols, the PCS circuitry may be configured to perform, among other functions, 8 bit-to-10 bit and/or 128 bit-to-130 bit encoding for data to be sent to the PMA circuitry and 10 bit-to-8 bit and/or 130 bit-to-128 bit decoding for data received from the PMA circuitry. The PMA circuitry may be configured to perform, among other functions, serialization of data to be transmitted (conversion from parallel to serial) and de-serialization of received data (conversion from serial to parallel).

A subset of the LABs 12 coupled to modules in the PMA/PCS array 30 may be configured to implement the methods and apparatus described above. Alternatively, the above-described methods and apparatus may be implemented using hardwired circuitry, or part configured LABs 12 and part hardwired circuitry.

It is to be understood that FPGA 10 is described herein for illustrative purposes only and that the present invention can be implemented in many different types of PLDs, FPGAs, and ASICs.

Figure 6:
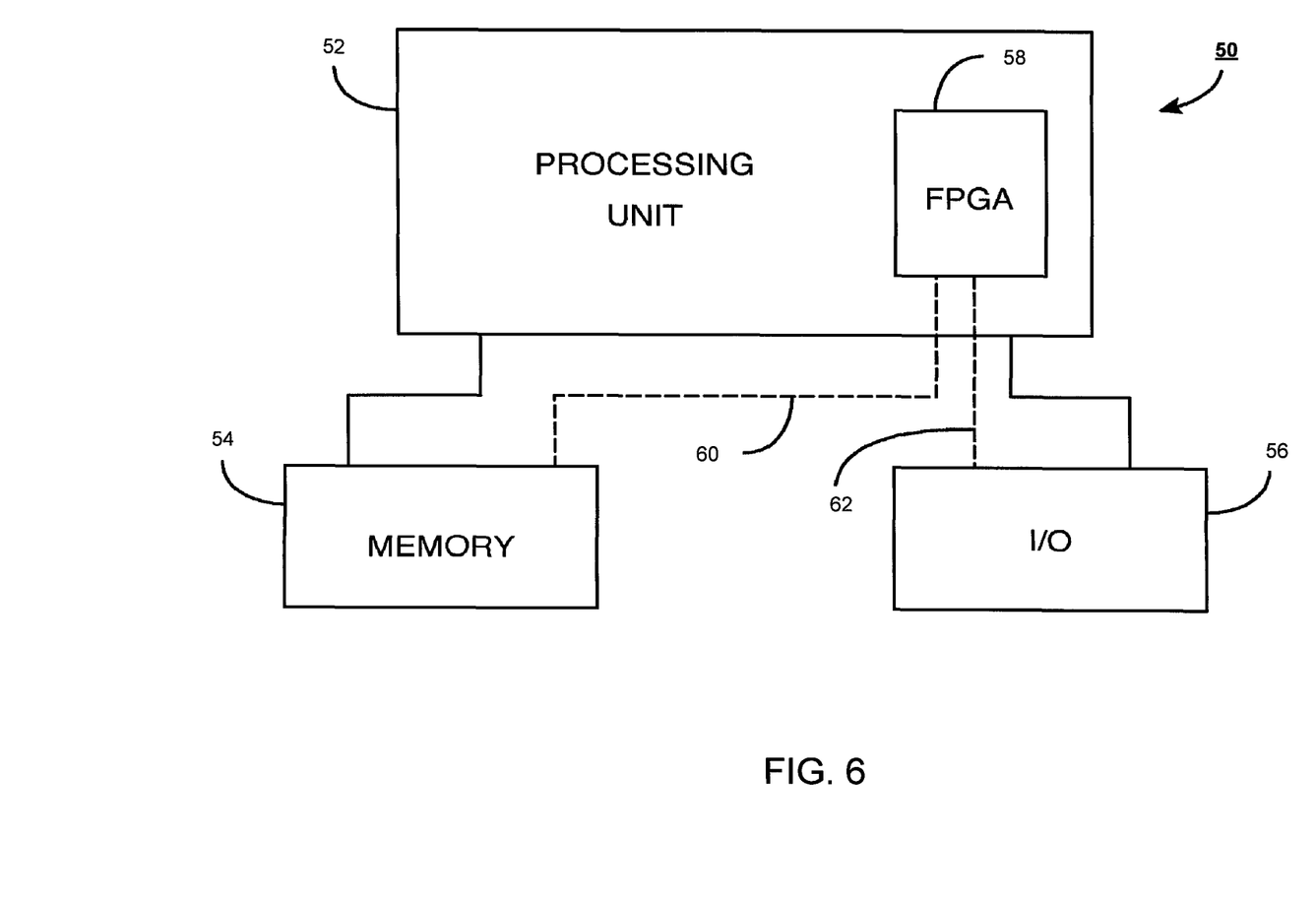
FIG. 6 shows a block diagram of an exemplary digital system that may be configured to utilize an embodiment of the present invention.

FIG. 6 shows a block diagram of an exemplary digital system 50 that can embody techniques of the present invention. As shown, the exemplary digital system 50 may include an FPGA as one of several components.

System 50 may be a programmed digital computer system, digital signal processing system, specialized digital switching network, or other processing system. Moreover, such systems can be designed for a wide variety of applications such as telecommunications systems, automotive systems, control systems, consumer electronics, personal computers, Internet communications and networking, and others. Further, system 50 may be provided on a single board, on multiple boards, or within multiple enclosures.

System 50 includes a processing unit 52, a memory unit 54, and an input/output (I/O) unit 56 interconnected together by one or more buses. According to this exemplary embodiment, FPGA 58 is embedded in processing unit 52. FPGA 58 can serve many different purposes within the system 50. FPGA 58 can, for example, be a logical building block of processing unit 52, supporting its internal and external operations. FPGA 58 may be programmed to implement the logical functions necessary to carry on its particular role in system operation. FPGA 58 may be specially coupled to memory 54 through connection 60 and to I/O unit 56 through connection 62.

Processing unit 52 may direct data to an appropriate system component for processing or storage, execute a program stored in memory 54, receive and transmit data via I/O unit 56, or other similar function. Processing unit 52 may be a central processing unit (CPU), microprocessor, floating point coprocessor, graphics coprocessor, hardware controller, microcontroller, field programmable gate array programmed for use as a controller, network controller, or any type of processor or controller. Furthermore, in many embodiments, there is often no need for a CPU.

For example, instead of a CPU, one or more FPGAs 58 may control the logical operations of the system. As another example, FPGA 58 acts as a reconfigurable processor that may be reprogrammed as needed to handle a particular computing task. Alternately, FPGA 58 may itself include an embedded microprocessor. Memory unit 54 may be a random access memory (RAM), read only memory (ROM), fixed or flexible disk media, flash memory, tape, or any other storage means, or any combination of these storage means.

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc.

In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize. These modifications may be made to the invention in light of the above detailed description.

What is claimed is:

1. A data transmission circuit with deterministic flow control, the data transmission circuit comprising:
   a plurality of first-in-first-out (FIFO) buffers;
   a plurality of transmitter lane circuits, each transmitter lane circuit performs reading of data bits from a corresponding FIFO buffer of the plurality of FIFO buffers;
   a transmitter media access control (MAC) circuit that performs writing of data bits to the plurality of FIFO buffers; and
   a transmitter aligner circuit that receives an empty signal from each of the plurality of FIFO buffers and provides a credit signal to the transmitter MAC circuit, wherein the transmitter aligner circuit includes control circuitry that performs one or more iterations of a procedure to determine a starting offset, wherein the starting offset provides an initial delay between the writing of the data bits to the plurality of FIFO buffers and the reading of the data bits from the plurality of FIFO buffers.

2. The data transmission circuit of claim 1, wherein the control circuitry of the transmitter aligner circuit performs an initialization stage before performing said one or more iterations, the initialization stage comprising:
   setting the starting offset to an initial value; and
   waiting until all of the plurality of FIFO buffers have asserted the empty signal.

3. The data transmission circuit of claim 2, wherein the procedure to determine the starting offset
   asserts the credit signal so that the transmitter MAC circuit writes data to the plurality of FIFO buffers,
   performs monitoring of an empty condition in relation to the plurality of FIFO buffers during a monitoring period, and
   increments the starting offset when the empty condition occurs at least once during the monitoring period,
   wherein the empty condition occurs when the empty signal is asserted by at least one of the plurality of FIFO buffers.

4. The data transmission circuit of claim 3, wherein the procedure to determine the starting offset declares a transmitter lane alignment when no empty condition occurs during the monitoring period.

5. The data transmission circuit of claim 4, wherein the procedure to determine the starting offset, after transmitter lane alignment is declared, issues at least one additional credit from the transmitter aligner circuit to the transmitter MAC circuit.

6. The data transmission circuit of claim 2, wherein the procedure to determine the starting offset
   asserts the credit signal so that the transmitter MAC circuit writes data to the plurality of FIFO buffers,
   performs monitoring of an underflow condition in relation to the plurality of FIFO buffers during a monitoring period, and
   increments the starting offset when the underflow condition occurs at least once during the monitoring period, wherein the underflow condition occurs when the empty signal is asserted by at least one of the plurality of FIFO buffers while a read enable signal of the data transmission circuit is asserted.

7. The data transmission circuit of claim 6, wherein the procedure to determine the starting offset declares a transmitter lane alignment when no underflow condition occurs during the monitoring period.

8. The data transmission circuit of claim 7, wherein the procedure to determine the starting offset, after transmitter lane alignment is declared, issues at least one additional credit from the transmitter aligner circuit to the transmitter MAC circuit.

9. The data transmission circuit of claim 1, wherein the control circuitry of the transmitter aligner circuit performs an initialization stage before performing said one or more iterations, the initialization stage comprising:
   setting the starting offset to an initial value; and
   waiting until all of the plurality of FIFO buffers have asserted a partial empty signal, wherein the partial empty signal is asserted by a FIFO buffer when the FIFO buffer is at or below a partial empty threshold level.

10. The data transmission circuit of claim 9, wherein the procedure to determine the starting offset
   performs monitoring of an empty condition during a monitoring period and
   increments the starting offset when the empty condition occurs at least once during the monitoring period,
   wherein the empty condition occurs when the empty signal is asserted by at least one of the plurality of FIFO buffers.

11. The data transmission circuit of claim 10, wherein the procedure to determine the starting offset declares a transmitter lane alignment when no empty condition occurs during the monitoring period.

12. The data transmission circuit of claim 9, wherein the procedure to determine the starting offset
   performs monitoring of an underflow condition during a monitoring period and
   increments the starting offset when the underflow condition occurs at least once during the monitoring period,
   wherein the underflow condition occurs when the empty signal is asserted by at least one of the plurality of FIFO buffers while a read enable signal of the data transmission circuit is asserted.

13. The data transmission circuit of claim 12, wherein the procedure to determine the starting offset declares a transmitter lane alignment when no underflow condition occurs during the monitoring period.

14. A method of reducing data path latency in a data transmission circuit with deterministic flow control, the method comprising:
   setting a starting offset to an initial value by a transmitter aligner circuit, wherein the starting offset provides an initial delay between writing data bits to a plurality of FIFO buffers and reading the data bits from the plurality of FIFO buffers;
   waiting, by the transmitter aligner circuit, until all of the plurality of FIFO buffers have asserted a low-fullness level signal; and
   performing, by the transmitter aligner circuit, one or more iterations of a procedure to determine the starting offset.

15. The method of claim 14, wherein the procedure to determine the starting offset
   issues a credit to a transmitter media access control (MAC) circuit so that the transmitter MAC circuit writes data to the plurality of FIFO buffers,
   performs monitoring of an empty condition in relation to the plurality of FIFO buffers during a monitoring period, and
   increments the starting offset when the empty condition occurs at least once during the monitoring period,
   wherein the empty condition occurs when an empty signal is asserted by at least one of the plurality of FIFO buffers.

16. The method of claim 15, wherein the procedure to determine the starting offset declares a transmitter lane alignment when no empty condition occurs during the monitoring period.

17. The method of claim 16, wherein the procedure to determine the starting offset, after transmitter lane alignment is declared, issues at least one additional credit to the transmitter MAC circuit.

18. The method of claim 14, wherein the procedure to determine the starting offset
   issues a credit to a transmitter media access control (MAC) circuit so that the transmitter MAC circuit writes data to the plurality of FIFO buffers,
   performs monitoring of an underflow condition in relation to the plurality of FIFO buffers during a monitoring period, and
   increments the starting offset when the underflow condition occurs at least once during the monitoring period,
   wherein the underflow condition occurs when an empty signal is asserted by at least one of the plurality of FIFO buffers while a read enable signal of the data transmission circuit is asserted.

19. The method of claim 18, wherein the procedure to determine the starting offset declares a transmitter lane alignment when no underflow condition occurs during the monitoring period.

20. The method of claim 19, wherein the procedure to determine the starting offset, after transmitter lane alignment is declared, issues at least one additional credit to the transmitter MAC circuit.

* * * * *